US007419013B2

(12) United States Patent
Sainomoto et al.

(10) Patent No.: US 7,419,013 B2

(45) Date of Patent: Sep. 2, 2008

(54) ROTARY IMPACT TOOL

(75) Inventors: Yoshinori Sainomoto, Sanda (JP); Tatsuhiko Matsumoto, Habikino (JP); Tadashi Arimura, Kyoto (JP); Toshiharu Ohashi, Sakata-gun (JP); Hidenori Shimizu, Hikone (JP); Fumiaki Sawano, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/126,350

(22) Filed: May 11, 2005

(65) Prior Publication Data

US 2005/0263304 A1 Dec. 1, 2005

(30) Foreign Application Priority Data

May 12, 2004 (JP) ............................ 2004-142848

(51) Int. Cl.
*B23B 45/16* (2006.01)

(52) U.S. Cl. ........................ 173/181; 173/176; 173/104

(58) Field of Classification Search ..................... 173/2, 173/176, 178, 180, 181, 182, 1; 81/467, 81/470, 474; 700/90, 117, 168
See application file for complete search history.

(56) References Cited

U.S. PATENT DOCUMENTS

| | | | | |
|---|---|---|---|---|
| 5,289,885 | A * | 3/1994 | Sakoh | 173/2 |
| 6,371,218 | B1 * | 4/2002 | Amano et al. | 173/183 |
| 6,516,896 | B1 * | 2/2003 | Bookshar et al. | 173/1 |
| 6,598,684 | B2 * | 7/2003 | Watanabe | 173/2 |
| 6,607,041 | B2 * | 8/2003 | Suzuki et al. | 173/4 |
| 6,945,337 | B2 * | 9/2005 | Kawai et al. | 173/183 |
| 2004/0238191 | A1 | 12/2004 | Shinagawa et al. | |
| 2005/0109519 | A1 | 5/2005 | Kawai et al. | |
| 2005/0121209 | A1 | 6/2005 | Shimizu et al. | |

FOREIGN PATENT DOCUMENTS

JP 2000-354976 12/2000

OTHER PUBLICATIONS

U.S. Appl. No. 11/126,351 to Shimizu et al., filed May 11, 2005.
U.S. Appl. No. 11/126,338 to Shimizu et al., filed May 11, 2005.

* cited by examiner

*Primary Examiner*—Rinaldi I. Rada
*Assistant Examiner*—Lindsay Low
(74) *Attorney, Agent, or Firm*—Greenblum & Bernstein, P.L.C.

(57) ABSTRACT

A rotary impact tool can be used in a work especially precision or finishing of fastening is important. The rotary impact tool comprises a rotary driving mechanism including a driving source for rotating a driving shaft, a hammer fixed on the driving shaft, an output shaft to which a driving force is applied by impact blow of the hammer, a torque setting unit used for setting a fastening torque, a processor for calculating fastening torque from impact blow of the hammer, a rotation speed setting unit used for setting rotation speed of the driving shaft, and a controller for rotating the driving shaft of the rotary driving mechanism in a rotation speed set in the rotation speed setting unit and for stopping rotation of the driving shaft of the rotary driving mechanism when the fastening torque calculated in the processor becomes equal to or larger than a reference value of fastening torque previously set in the torque setting unit.

7 Claims, 6 Drawing Sheets

ROTARY IMPACT TOOL

BACKGROUND OF THE INVENTION

1. Field of the Invention

The present invention relates to a rotary impact tool such as an impact wrench or an impact driver used for fastening or loosening of fastening member such as a screw, a bolt or a nut.

2. Description of the Related Art

In a rotary impact tool used for fastening a member to be fastened such as a bolt or a nut, it is desirable that a driving source is stopped for completing a fastening operation when a fastening torque reaches a predetermined set value. Although measurement of actual fastening torque is most desirable at a point of precision of fastening, it is necessary to provide a torque sensor in an output shaft of the rotary impact tool. It causes not only increase of cost and upsizing of the rotary impact tool but also decrease of usability. Thus, the fastening torque is estimated with various methods and the fastening torque is limited with the estimated value in the conventional rotary impact tool. In the conventional rotary impact tool, the motor serving as a driving source is normally rotated at the highest rotation speed, and the setting of the fastening torque depends on such an assumption. Therefore, the conventional rotary impact tool is suitable for fastening an object with heavy load. However, when the conventional rotary impact tool is used for fastening an object with a light load, the object, for example, a fastening member such as a bolt will be damaged by several impacts or over fastening may occur, even though the fastening torque is set to be the smallest value. Thus, the conventional rotary impact tool is rarely used for a work such as an interior finish work in which the finish precision is emphasized.

For limiting the fastening torque by estimation of the fastening torque, it is possible to simplify the stop control of the driving source by stopping the driving source when a counted number of impacts reaches a value previously set or a value calculated with a torque gradient after stopping normal rotation of a bit of the rotary impact tool. The actual fastening torque, however, is largely different from the desired fastening torque, so that damage to the object to be fastened due to over fastening or loose fastening members due to under fastening occurs.

In addition, it is proposed that a rotation angle of a fastening member as the fastening member is measured and the driving source is stopped when a rotation angle of the fastening member in each impact becomes equal to or smaller than a predetermined angle. Since the rotation angle of the fastening member is in inverse proportion to the fastening torque, such a rotary impact tool is controlled with fastening torque in theory. The rotary impact tool with a driving source moved by a battery, however, has a problem that the fastening torque largely varies due to voltage drop of the battery. In addition, it is largely affected by properties such as hardness or softness of the object to be fastened by the fastening member.

In another conventional rotary impact tool shown in Japanese Laid-Open Patent Publication No. 2000-354976, impact energy and rotation angle of a fastening member in each impact are sensed, and a fastening torque is calculated with using the impact energy and the rotation angle of the fastening member. When the calculated fastening torque becomes equal to or larger than a predetermined set value, the driving source is stopped. It is further shown that the impact energy is calculated with using a rotation speed of an output shaft at instant of impact of the output shaft and rotation speed of the output shaft just after the impact. Since the impact energy is calculated with the rotation speed of the output shaft at instant of impact, it needs a high resolution sensor and high speed processor which cause to increase of cost.

SUMMARY OF THE INVENTION

A purpose of the present invention is-to provide a rotary impact tool, which is usable in a work in which finish precision is emphasized, and can control proper torque control in a wide range of fastening torque with low cost.

A rotary impact tool in accordance with an aspect of the present invention comprises: a rotary driving mechanism including a driving source for rotating a driving shaft, a hammer fixed on the driving shaft; an output shaft to which a driving force is applied by impact blow of the hammer; a torque setting unit used for setting a fastening torque; a processor for calculating fastening torque from impact blow of the hammer; a rotation speed setting unit used for setting rotation speed of the driving shaft; and a controller for rotating the driving shaft of the rotary driving mechanism in a rotation speed set in the rotation speed setting unit and for stopping rotation of the driving shaft of the rotary driving mechanism when the fastening torque calculated in the processor becomes equal to or larger than a reference value of fastening torque previously set in the torque setting unit.

By such as configuration, it is possible to set the fastening torque optionally corresponding to the kind of fastening work. For example, when an object to be fastened by a fastening member such as a screw is a plaster board which needs low speed and low fastening torque, it is possible that the fastening torque can be set to be a smaller value. Thus, the rotary impact tool can be used for a work in which the precision and finishing of the fastening of the fastening member is important. Alternatively, when an object to be fastened by a fastening member such as a bolt is a steel plate which needs high speed and high fastening torque, it is possible that the fastening torque can be set to be a larger value. Thus, the rotary impact tool can be used for a work in which the speed of fastening work is required. Consequently, it is possible to provide a rotary impact tool, which is usable in a work in which finish precision is emphasized, and can control proper torque control in a wide range of fastening torque with low cost.

DETAILED DESCRIPTION OF THE EMBODIMENT

Figure 1:
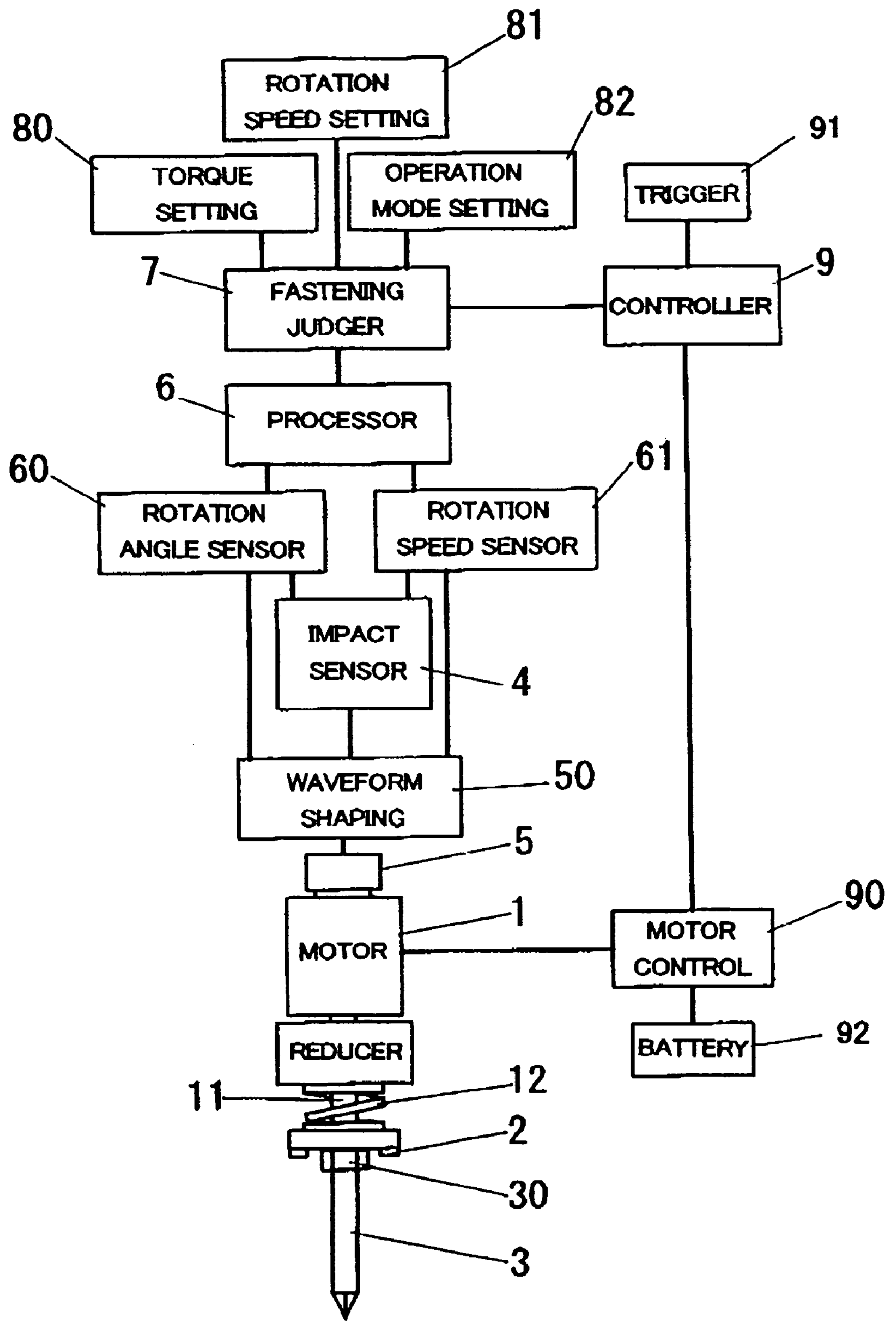
FIG. 1 is a block diagram showing a configuration of a rotary impact tool in accordance with an embodiment of the present invention.

A rotary impact tool in accordance with an embodiment of the present invention is described. A configuration of the rotary impact tool is shown in FIG. 1. The rotary impact tool comprises a rotary driving mechanism including a motor 1 as a driving source. The rotation force of the motor 1 is transmitted to a driving shaft 11 via a reducer having a predetermined reduction ratio. A hammer 2 is provided on the driving shaft 11 via a cam mechanism (not illustrated), and the hammer 2 is pressed toward an output shaft 3 by a spring 12.

The output shaft 3 has an anvil 30 which further comprises an engaging portion for engaging with the hammer 2 in the rotary direction of the output shaft 3. When no load is applied to the output shaft 3, the hammer 2 rotates with the output shaft 3. alternatively, when a load equal to or larger than a predetermined value is applied to the output shaft 3, the hammer 2 moves backward against the pressure of the spring 12, and turns to move forward with rotation when the engagement with the anvil 30 is released, and applies impact blow to the anvil 30 in rotary direction so that the output shaft 30 is rotated.

In such a rotary impact tool, a torque setting unit 80 used for setting a value of fastening torque, a rotation speed setting unit 81 used for limiting rotation speed of the motor 1, and an operation mode setting unit 82 used for switching between normal fastening mode and tight fastening mode are provided.

Figure 2:
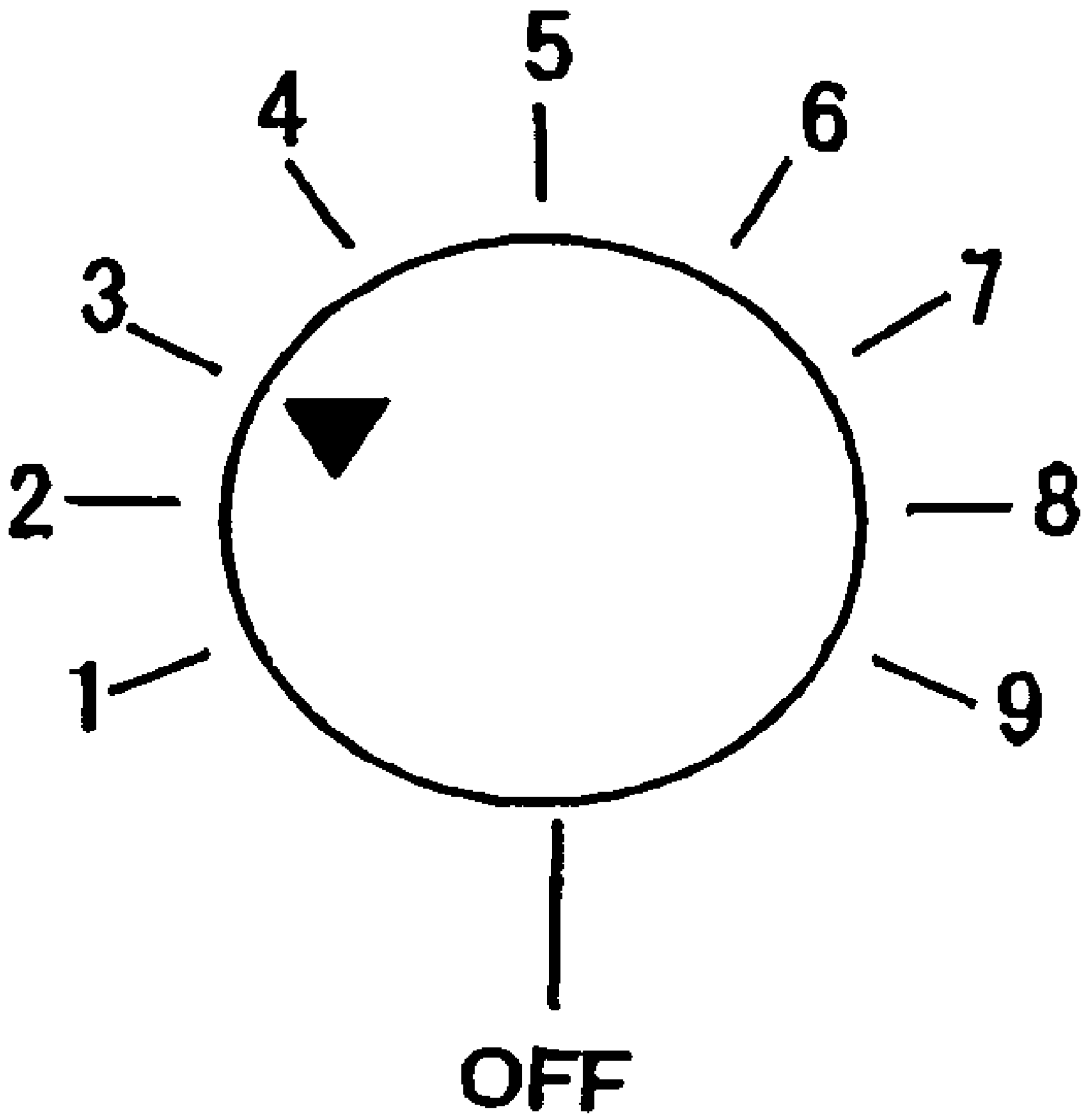
FIG. 2 is a front view showing an example of a torque setting switch of the rotary impact tool in the embodiment.

FIG. 2 shows an example of the torque setting unit 80. The torque setting unit 80 is a rotary switch having nine positions 1 to 9 of values of torque, and an off position where the value of torque is infinity.

Figure 3:
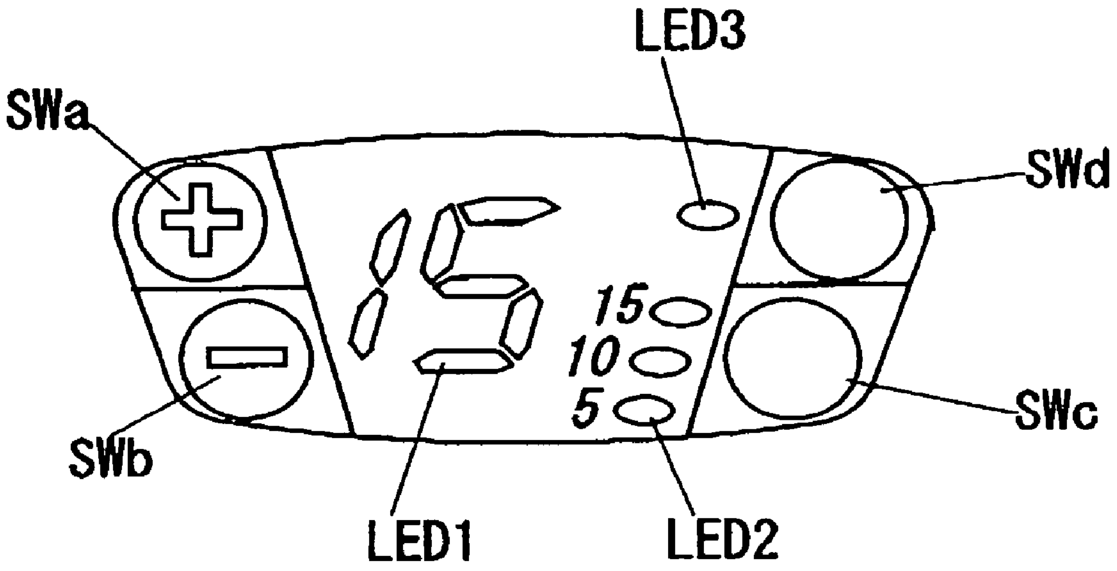
FIG. 3 is a front view showing another example of a torque setting unit, a rotation speed setting unit and a operation mode setting unit of the rotary impact tool in the embodiment.

FIG. 3 shows another example of the torque setting unit 80. The torque setting unit 80 comprises a seven segments type light emission display device LED1 which can indicate a value corresponding to the torque as 19 phases, a plus key SWa and a minus key SWb. When the plus key SWa or the minus key SWb is operated, the numerical value of indication of the light emission display device LED1 is increased or decreased, so that the value of fastening torque can be varied corresponding to the indication. In addition, the off mode when the value of torque is infinity is indicated by, for example, a symbol "F". When the fastening member is a small screw or an object to be fastened is made of a soft material, the torque necessary for fastening the fastening member is smaller, so that the fastening torque should be set smaller. Alternatively, when the fastening member is a large bolt or an object to be fastened is made of a hard material, the torque necessary for fastening the fastening member is larger, so that the fastening torque should be set larger.

When the torque setting unit 80 is a rotary switch as shown in FIG. 2, the rotation speed setting unit 81 can be constituted as a rotary switch or a slide switch. When the torque setting unit 80 is constituted by a display device and key switches as shown in FIG. 3, the rotation speed setting unit 81 can be constituted by three light emitting diodes LED2 used for showing 3 phases of rotation speed and a rotation speed setting key SWc. When a number of lit light emitting diodes LED2 is increased or decreased by operating the rotation speed setting key SWc, the rotation speed of the motor 1 can be varied corresponding to the phase of indication of the light emitting diodes LED2.

In the example shown in FIG. 3, the operation mode setting unit 82 can be constituted by a light emitting diode LED3 and an operation mode setting key SWd. When the operation mode setting key SWd is once operated, the light emitting diode LED3 is lit for showing a tight fastening mode is set, and when the operation mode setting key SWd is twice operated, the light emitting diode LED3 is off for showing a normal fastening mode is set.

A rotation sensor 5 is provided on the motor 1 for sensing the rotation of the shaft of the motor 1. As the rotation sensor 5, a frequency generator, a magnetic rotary encode or an optical rotary encoder can be used. The frequency generator has a magnetized disc fixed on the shaft of the motor, and senses the rotation of the disc with a coil. The magnetic rotary encoder has a magnetized disc fixed on the shaft of the motor, and senses the rotation of the disc with a hall IC. The optical rotary encoder has a disc with slits fixed on the shaft of the motor, and senses the rotation of the disc with a photo-coupler. Output signal from the rotation sensor 5 is processed the waveform shaping of pulse width signal corresponding to the rotation speed of the motor 1 through a waveform shaping circuit 50, and transmitted to an impact sensor 4, an output side rotation angle sensor 60 and an input side rotation speed sensor 61.

The impact sensor 4 senses occurrence of impact blow of the hammer 2 on the anvil 30 fixed on the output shaft 3. Since the rotation speed of the motor 1 falls slightly due to a load change at the time of occurrence of the impact blow, the impact sensor 40 senses the occurrence of the impact blow utilizing a phenomenon that the pulse width of output of the rotation sensor 5 becomes slightly longer. The impact sensor 4, however, is not limited to this configuration. It is possible to sense the occurrence of the impact blow with using blow sound gathered with a microphone 40 or with using an acceleration sensor.

A processor 6 estimates a current fastening torque from outputs of the output side rotation angle sensor 60 and the input side rotation speed sensor 61. A fastening judger 7 compares the estimated value of the current fastening torque with a value of a predetermined reference torque set in the torque setting unit 80. When the value of the current fastening torque becomes larger than the value the reference torque, the fastening judger 7 outputs a stop signal for stopping the rotation of the motor 1 to the controller 9. The controller 9 stops the rotation of the motor 1 via a motor control circuit 90 corresponding to the stop signal. In FIG. 1, numeric references 91 and 92 respectively designate a trigger switch and a rechargeable battery.

Hereupon, the output side rotation angle sensor 60 does not directly sense a rotation angle Δ r of the anvil 30 or the output shaft 30 while the impact blow, but it calculates the rotation angle of the output shaft 3 between an impact blow and next impact blow with using a rotation angle Δ RM of the driving shaft 11 which can be obtained from output of the rotation sensor 5. In other words, when a reduction ratio from the motor 1 to the output shaft 3 is designated by a symbol "K", a skidding angle of the hammer 2 is designated by a symbol "RI" (when the hammer 2 can engage with the anvil 30 twice per one turn, the skidding angle of the hammer 2 becomes $2\pi/2$, and when the hammer 2 can engage with the anvil 30 thrice per one turn, the skidding angle of the hammer 2 becomes $2\pi/3$),the rotation angle Δr between the impact blows is shown by the following equation.

$$\Delta r=(\Delta RM/K)-RI$$

When a moment of inertia of the output shaft 3 with the anvil 30 is designated by a symbol "J", a mean rotation speed of input side between the impact blows is designated by a symbol "ω", and a coefficient for converting to impact energy is designated by a symbol "C1", the processor 6 calculates the fastening torque T as following equation.

$$T=(J\times C1\times\omega^2)/2\times\Delta r$$

The mean rotation speed ω of input side between the impact blows can be obtained as a value an a division of a number of output pulses of the rotation sensor between the impact blows by a term between the impact blows.

According to the rotary impact tool in this embodiment, the torque control can be performed only by measurement of term between an impact blow and next impact blow and counting of a number of output pulses of the rotation sensor 5. Thus, the torque control can be performed with standard one-chip microcomputer comprising a timer and a counter, without using one which can perform a high speed processing.

Figure 4:
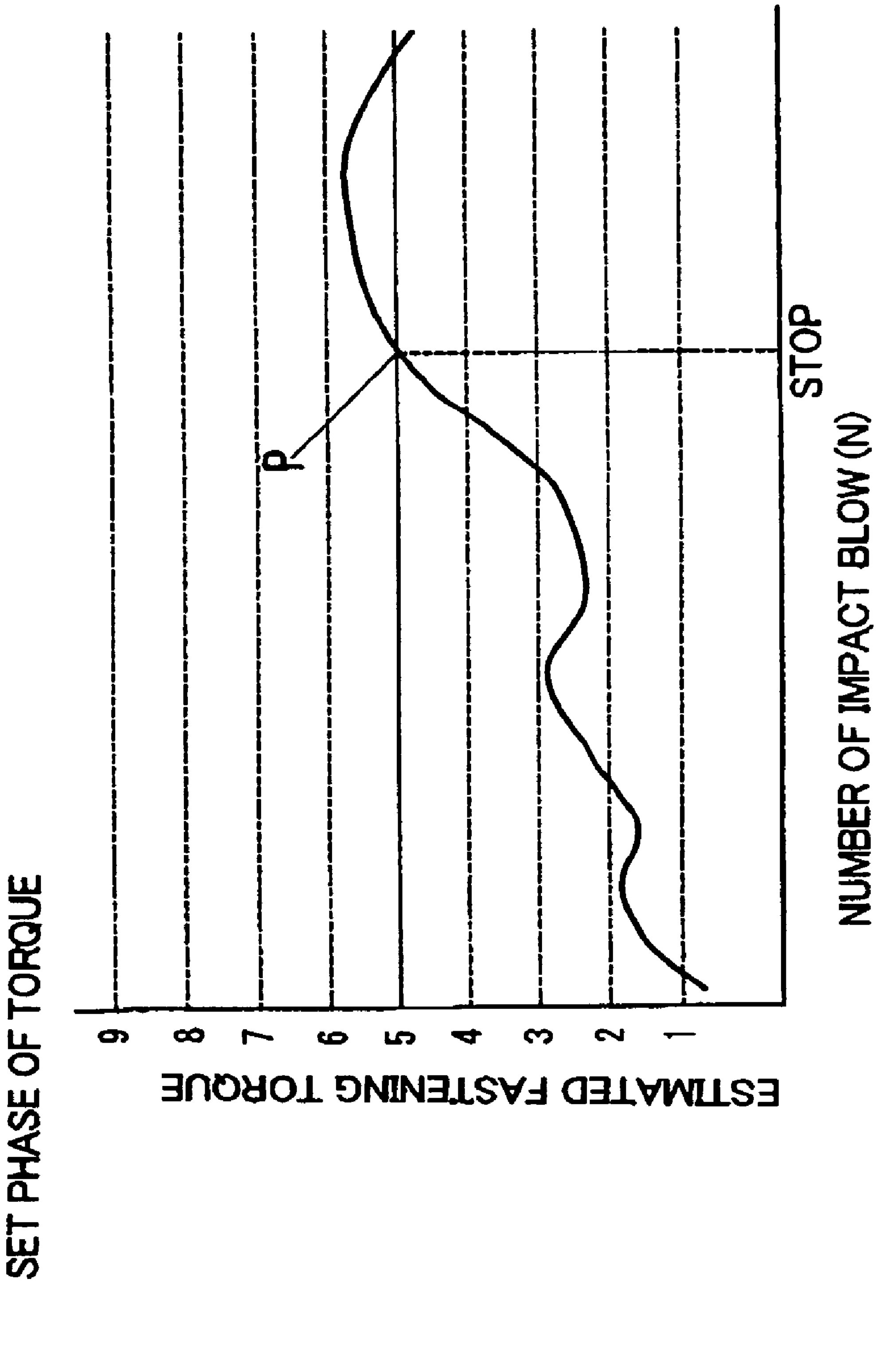
FIG. 4 is a graph showing a relation between the estimated torque and an impact number in an example of driving operation of the rotary impact tool in the embodiment.

FIG. 4 shows a relation between an estimated fastening torque and a number of impact blows when the fastening torque is set to be phase 5. The abscissa designates the number of impact blows, and the ordinate designates the estimated fastening torque. Since the estimated fastening torque includes a lot of dispersion, it is preferable that the estimated fastening torque is calculated based on moving average of the number of impact blows. As can be seen from FIG. 4, the estimated fastening torque gradually increases with slight torque variation after starting the impact blow. When the value of the estimated fastening torque becomes larger than a value of torque corresponding to the phase 5 (at point P in the figure), the rotation of the motor 1 is stopped.

Figure 5:
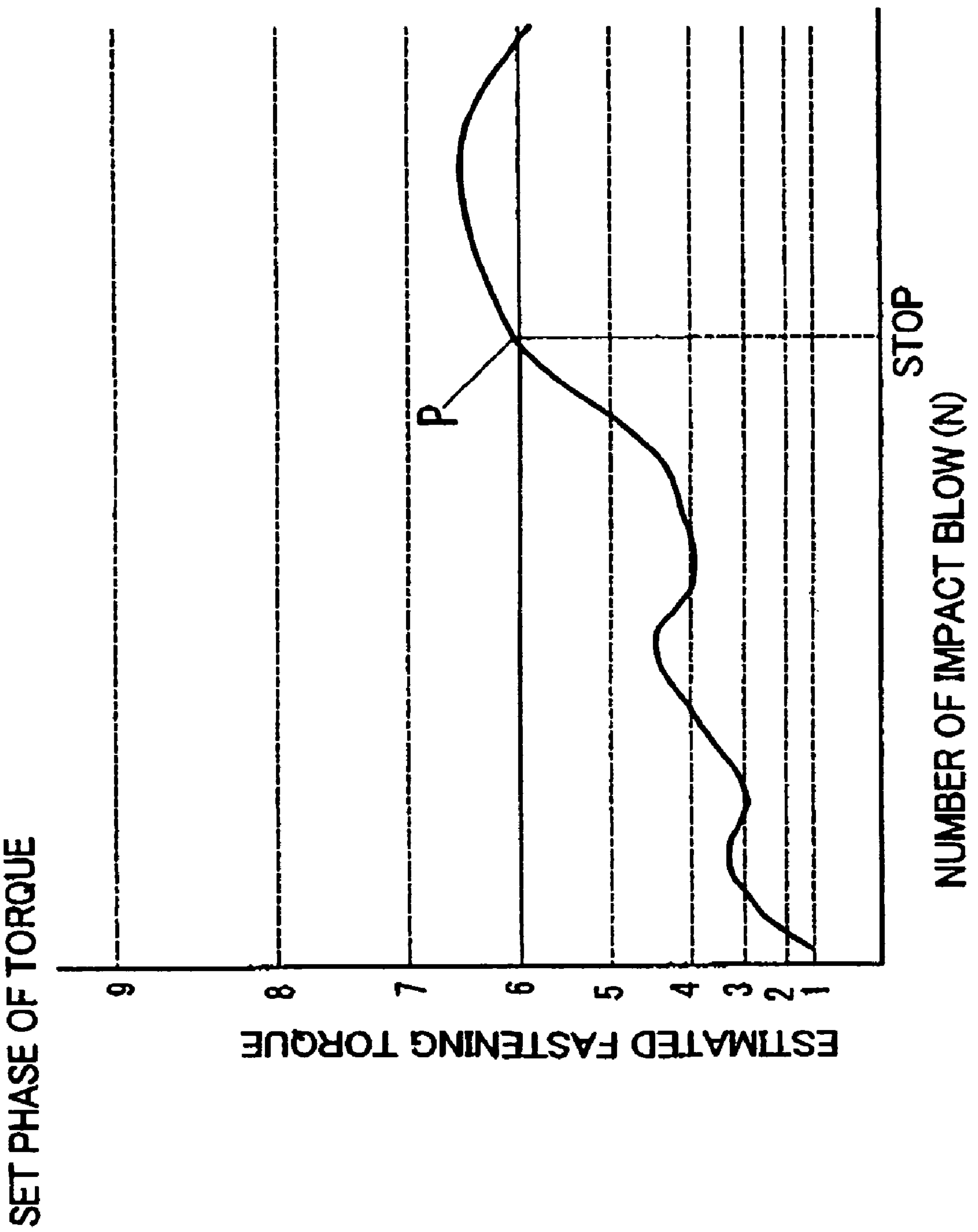
FIG. 5 is a graph showing a relation between the estimated torque and an impact number in another example of driving operation of the rotary impact tool in the embodiment.

In the example shown in FIG. 4, the value of fastening torque at each phase increases evenly. It, however, is possible that the value of fastening torque at each phase increases unevenly so that the degree of increase of the value of fastening torque becomes larger with the increase of the phase, as shown in FIG. 5. In a region where the set value of fastening torque is smaller, it is possible to adjust the fastening torque finely for fastening a smaller fastening member. In a region where the set value of fastening torque is larger, it is possible to adjust the fastening torque roughly for fastening a larger fastening member.

Since the impact energy is the energy of the hammer 2 in a moment when it comes into collision with the anvil 30, it is necessary to measure the moving speed of the hammer 2 precisely in a moment of the collision, precisely. The hammer 2, however, moves backward and forward along the driving shaft 11, and the impact force acts on the hammer 2 and the anvil 30. Thus, it is very difficult to provide the encoder in the vicinity of the hammer 2 and the anvil 30. In this embodiment, the impact energy is calculated based on the mean moving speed of the driving shaft 11 in the input side of the driving force. Furthermore, the spring 12 intervenes between the hammer 2 and the driving shaft 11, so that the impact mechanism is complex. Thus, the mean rotation speed of input side "ω" and the coefficient "C1" which is experimentally obtained are used. However, when the rotation speed of the motor 1 becomes very slow due to voltage drop of the battery or when the motor 1 is driven in a speed control region of the trigger switch 91, the calculation of the impact energy includes various error components.

Therefore, in case of varying the rotation speed of the motor 1 in the input side, it is preferable that the estimated fastening torque is calculated with using the following equation.

$$T=(J\times F(\omega)\times\omega^2)/2\times\Delta r$$

Hereupon, a compensation function F(ω) for the mean rotation speed ω is used instead of the coefficient C1 in the above-mentioned equation for calculating the impact energy from the mean rotation speed ω. The function F(ω) is caused by the impact mechanism and experimentally obtained with using an actual tool. For example, when the rotation speed ω is smaller, the value of the function F(ω) becomes larger. By performing the compensation of the function F(ω) corresponding to the mean rotation speed of the driving shaft 11 in input side, the precision of the estimated fastening torque can be increased, so that the fastening member such as a screw can be fastened precisely.

In case that the resolution of the rotation sensor 5 is 24 pulses per one turn, the reduction ratio K=8, and the hammer 2 can engage with the anvil 3 twice per one turn, the pulse number while the impact blows of the hammer 2 with the anvil 30 when the output shaft 3 cannot turn at all becomes 96 pulses, since (½)×8×24=96. In case that the output shaft 3 rotates 90 degrees by one impact blow, the pulse number of the rotation sensor 5 becomes 144 pulses, since ((½)+(¼))×8×24=144. In other words, when the output pulse number of the rotation sensor 5 while the impact blows shows 144 pulses, the output shaft 3 rotates 90 degrees while 144−96=48 pulses of the output pulses of the rotation sensor 5. By the way, the rotation angle Δr of the fastening member per one pulse of the output of the rotation sensor 5 becomes 1.875 degrees. While two pulses are outputted from the rotation sensor 5, the output shaft 3 rotates 3.75 degrees. Similarly, the output shaft 3 rotates 5.625 degrees per 3 pulses, 7,5 degrees per 4 pulses, 45 degrees per 24 pulses, and 90 degrees per 48 pulses.

Hereupon, it is considered the case assumed that the fastening torque is very large. When the rotation angle of the output shaft 3 is about 3 degrees, the number of output pulses from the rotation sensor becomes one or two. Since the estimated fastening torque, however, is calculated with the above-mentioned equation, the value of the estimated fastening torque when it is calculated under the number of the output pulse of the rotation sensor 5 is one shows double than that when it is calculated under the number of the output pulses of the rotation sensor 5 is two. In other words, a large error component occurs in the value of the estimated fastening torque when the fastening torque is larger, so that malfunction for stopping the motor 1 occurs due to error component. If the rotation angle of the driving shaft 11 is precisely sensed by a high resolution rotation sensor 5, there is no problem, but it will be very expensive.

With this purpose, in this embodiment, a number such as 95 or 94, which is smaller than 96 with an offset, is subtracted from the number of the output pulses of the rotation sensor 5 for calculating the rotation angle of the fastening member, instead of subtracting the number of pulses corresponding to the rotation of the hammer 2 (for example, 96 in the above-mentioned case). When the number to be subtracted from the number of the output pulses of the rotation sensor 5 is assumed as 94, the number of output pulses of the rotation sensor 5 while the rotation angle of output side rotates by three degrees becomes three or four. In such a case, the estimated fastening torque when the number of output pulses of the rotation sensor 5 is assumed as three becomes about 1.3 times as larger than that when the number of output pulses of the rotation sensor 5 is assumed as four. In comparison with no offset, the error component can be reduced. It is needless to say that numerator in the above-mentioned equation is compensated to two times or three times larger. When the rotation angle of the output side is larger, the number of output pulses of the rotation sensor 5 with offset corresponding to the rotation angle of 90 degrees becomes 50. On the other hand, it becomes 48 with no offset. Thus, the error component can be reduced in a level of negligible.

Figure 6:
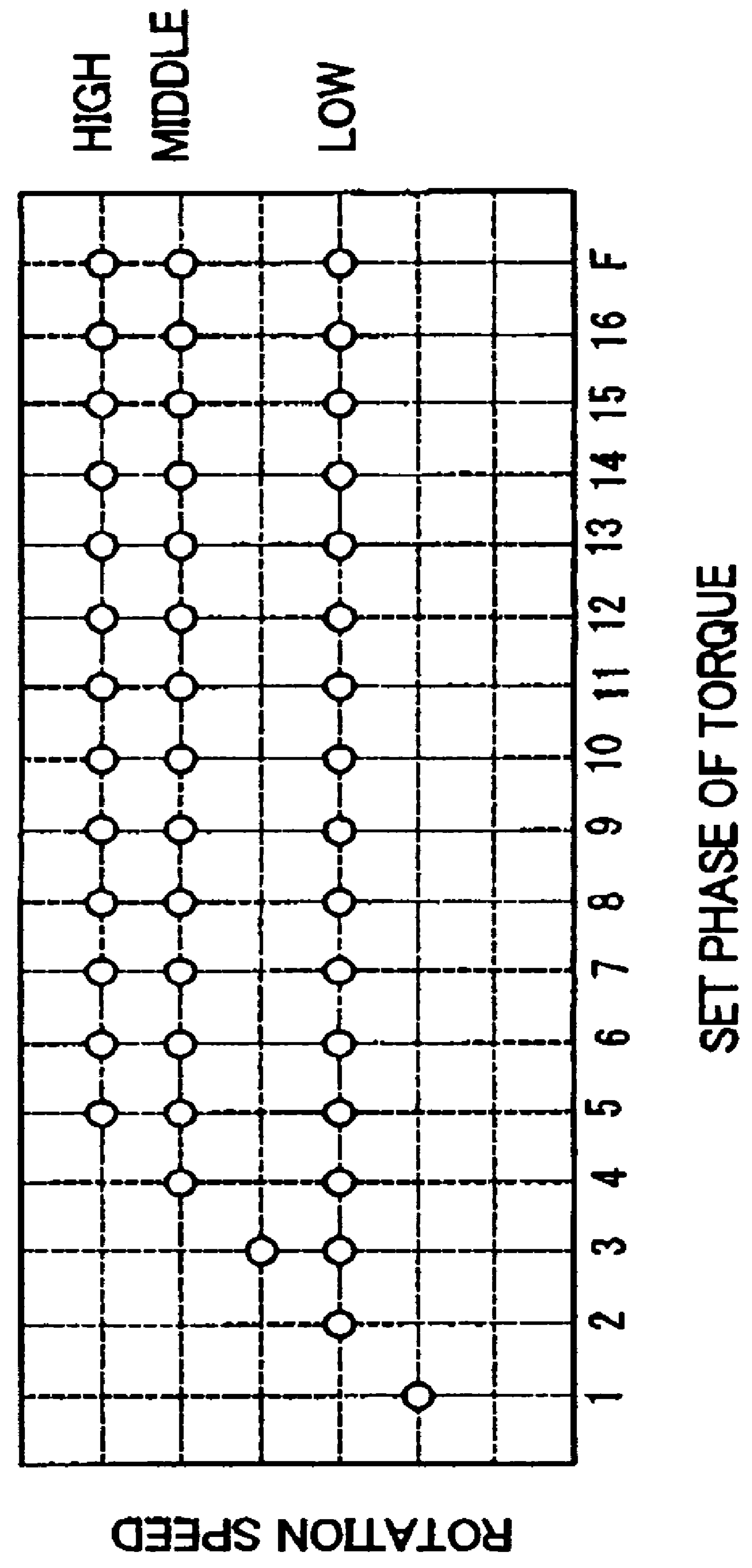
FIG. 6 is a graph showing relations between rotation speed and a set value of torque in the rotary impact tool in the embodiment.

Hereupon, the value of the fastening torque set in the torque setting unit 80 and the limitation of the fastening torque due to the set value are based on the assumption that the rotation speed of the shaft of the motor 1 is constant and the highest. In this embodiment, the rotation speed of the shaft of the motor 1 is limited so as not to over the rotation speed set in the rotation speed setting unit 81. For example, when the rotation speed of the shaft of the motor 1 can be selectable one among high, middle and low levels, the value of the fastening torque can be set with each level, as shown in FIG. 6. Since the number of impact blows per unit time varies corresponding to the rotation speed of the shaft of the motor 1, it is possible to constitute the number of impact blows per unit time changeable.

When the value of the torque set in the torque setting unit 80 is smaller, the rotation speed setting unit 81 restricts the value settable is lower than the rotation speed normally settable. When the value of the torque set in the torque setting unit 80 is higher and the set level of the torque is equal to or smaller than four, the rotation speed of the shaft of the motor 1 is limited corresponding to the set level. When the level of the torque is set to be one, it is possible to set the rotation speed lower than the lowest rotation speed settable in the rotation speed setting unit 81.

Although the rotary impact tool has a merit that the work can be completed fast since the fastening member is fastened with high torque due to impact blow, it generally has demerits that the fastening member may be damaged or the object to be fastened may be broken while several times of impact blows due to high power. In the power of the rotary impact tool in this embodiment, the rotation speed setting unit 81 limits the rotation speed of the shaft of the motor 1 or limit the maximum rotation speed of the shaft of the motor 1 when the value of the fastening torque is set to be lower, so that the impact energy can be made lower. Thus, it can realize the work for fastening the small fastening member or an object to be fastened made of a soft material. Besides, if no impact blow occurs, the estimation of the fastening torque is impossible. Thus, the rotation speed of the shaft of the motor 1 is selected to a rotation speed at which the impact blow of the hammer 2 with the anvil 30 must occur.

Furthermore, even though the driving current is supplied to the motor 1, when the rotation speed sensor 61 cannot sense the output pulse of the rotation sensor 5 in a predetermined term, for example, several seconds, it is judged abnormal so that the supply of the driving current to the motor 1 is stopped and to alarm the occurrence of abnormal state. In such a case, it is thought that the motor is in locking state due to incoming of foreign matter into the motor 1 or burning out of the motor or due to braking of wire of the motor 1 or the rotation sensor 5. In the former case, a dangerous state such as firing or smoking may occur. In the latter case, the primary torque of the motor 1 cannot be controlled.

When the rotation speed of the shaft of the motor 1 is slow and the load is heave, the output shaft 3 may not be rotated although the motor 1 and the rotation sensor 5 are normal. Thus, it is preferable that the driving current for maximum rotation speed is supplied to the motor 1 when the output pulse of the rotation sensor 5 cannot be sensed. If the rotation speed sensor 61 cannot sense the output pulse of the rotation sensor 5 even so, it is sufficient to judge the occurrence of abnormal state so as to stop the supply of driving current to the motor 1 and to alarm the occurrence of the abnormal state, in view of prevention of malfunction.

The tight fastening mode is used for fastening the fastening member a little more, for example, when the fastening of the fastening member is stopped a little before the complete fastening in the normal fastening mode. In the tight fastening mode, an accumulation value of the rotation angles of the output shaft 3 from the starting of the impact blows of the hammer 2 with the anvil 30 is calculated. When the accumulation value becomes equal to or larger than a predetermined reference value, the supply of driving current to the motor 1 is stopped. It is preferable to set an angle between ½ to 1 turn as the reference value. It is possible to vary the reference value corresponding to the fastening torque set in the torque setting unit 80. For example, when the set value of the fastening torque is smaller, the precision of the complete fastening or the finishing is especially important, so that the reference value is set to be smaller. Alternatively, when the set value of the fastening torque is larger, the working speed is important, so that the reference value is set to be larger.

Furthermore, in the tight fastening mode, when a bolt is fastened to a nut or a steel plate, the bolt is rarely fastened after completing the fastening in the normal fastening mode with the set fastening torque. Thus, the accumulated value of the rotation angle of the bolt (fastening member) cannot reaches to the reference value, so that the bolt may be broken or the screw may be wring off. Thus, in this embodiment, when the accumulation value of the rotation angle of the output shaft 3 cannot be reached to a second reference value smaller than the reference value while a predetermined number of the impact blows of the hammer 2 with the anvil 30, the. supply of driving current to the motor 1 is stopped. The second reference value is set to be smaller than an accumulation value of the rotation of the output shaft 3 in the minute rotation angle conceivable.

This application is based on Japanese patent application 2004-142848 filed May 12, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A rotary impact tool comprising:

a rotary driving mechanism including a driving source that rotates a driving shaft;

a rotation sensor that senses rotation of a shaft of the driving source;

a hammer fixed on the driving shaft;

an output shaft to which a driving force is applied by impact blow of the hammer;

a torque setting unit that sets a fastening torque;

a processor that calculates fastening torque from impact blow of the hammer;

a rotation speed setting unit that sets rotation speed of the driving shaft;

a controller that rotates the driving shaft of the rotary driving mechanism in a rotation speed set in the rotation speed setting unit and stops rotation of the driving shaft of the rotary driving mechanism when the fastening torque calculated in the processor becomes equal to or larger than a reference value of fastening torque previously set in the torque setting unit;

an input side rotation speed sensor that is connected to the rotation sensor and senses rotation speed of the driving shaft of the rotary driving mechanism from a rotation angle of the driving shaft from an impact blow to a next impact blow of the hammer;

an impact sensor that senses occurrence of the impact blow of the hammer with the output shaft; and an output side rotation angle sensor that is connected to the rotation sensor and calculates the rotation angle of the output shaft from an impact blow to a next impact blow of the hammer using a rotation angle of the driving shaft of the driving source obtained from an output of the rotation sensor; wherein the processor calculates the fastening torque by dividing the impact energy, which is calculated using a mean rotation speed of the output shaft between the impact blows of the hammer sensed by the rotation angle sensor and the rotation speed sensor, by a rotation angle between the impact blows of the hammer which is sensed by the rotation angle sensor; and the controller drives the rotary driving mechanism at a rotation speed lower than a rotation speed set in the rotation speed setting unit, when a value of the fastening torque set in the torque setting unit is smaller than a predetermined reference value.

2. The rotary impact tool in accordance with claim 1, wherein the controller drives the rotary driving mechanism at a rotation speed further lower than a lowest rotation speed settable in the rotation speed setting unit, when a value of the fastening torque set in the torque setting unit is a smallest value settable in the torque setting unit.

3. The rotary impact tool in accordance with claim 1, wherein the controller determines an abnormal state and stops driving of the rotary driving mechanism, when rotation of the driving shaft of the rotary driving mechanism cannot be sensed by the rotation speed sensor while the controller drives the rotary driving mechanism.

4. The rotary impact tool in accordance with claim 3, wherein the controller drives the rotary driving mechanism at a highest rotation speed once with no relation to the rotation speed set in the rotation speed setting unit, when the rotation speed of the driving shaft cannot reach a predetermined reference speed sensed by the rotation speed sensor while the rotary driving mechanism is driven.

5. The rotary impact tool in accordance with claim 1, wherein the controller has a tight fastening mode further fastening a fastening member after stopping rotation of a fastening member in normal fastening mode, in which the driving of the rotary fastening mechanism is stopped when an accumulation value of rotation angle of the output shaft from start of impact blow of the hammer obtained by the rotation angle sensor reaches a predetermined reference value.

6. The rotary impact tool in accordance with claim 5, wherein in the tight fastening mode, the controller stops the driving of the rotary fastening mechanism when the accumulation value of rotation angle of the output shaft from start of impact blow of the hammer cannot reach a second predetermined reference value smaller than the reference value.

7. The rotary impact tool in accordance with claim 1, wherein the controller drives the rotary driving mechanism at a rotation speed lower than a rotation speed set in the rotation speed setting unit, when a value of the fastening torque set in the torque setting unit is smaller than a predetermined value.

* * * * *